(12) United States Patent
Takemoto et al.

(10) Patent No.: US 6,718,490 B1
(45) Date of Patent: Apr. 6, 2004

(54) METHOD AND APPARATUS FOR CONTROLLING WARNING-INFORMATION

(75) Inventors: Kazuhiro Takemoto, Hino (JP); Ryuichiro Kobayashi, Hino (JP)

(73) Assignee: Konica Corporation (JP)

( * ) Notice: Subject to any disclaimer, the term of this patent is extended or adjusted under 35 U.S.C. 154(b) by 638 days.

(21) Appl. No.: 09/640,940

(22) Filed: Aug. 17, 2000

(30) Foreign Application Priority Data

Aug. 19, 1999 (JP) .......................................... 11/232665

(51) Int. Cl.[7] .................................................. G06F 11/00
(52) U.S. Cl. ............................ 714/47; 345/707; 714/57
(58) Field of Search ............................. 714/47, 57, 46; 345/707

(56) References Cited

U.S. PATENT DOCUMENTS 5,018,082 A * 5/1991 Obata et al. ................. 345/707
5,042,006 A * 8/1991 Flohrer ........................ 345/707
6,021,403 A * 2/2000 Horvitz et al. ................. 706/45
6,047,261 A * 4/2000 Siefert .......................... 705/11
6,219,805 B1 * 4/2001 Jones et al. .................... 714/38
6,430,706 B1 * 8/2002 Santerre et al. ............... 714/36
6,463,441 B1 * 10/2002 Paradies ...................... 707/102

* cited by examiner

Primary Examiner—Scott Baderman
Assistant Examiner—Joshua Lohn
(74) Attorney, Agent, or Firm—Cantor Colburn LLP

(57) ABSTRACT

A control methods and an apparatus for outputting warning-information corresponding to the degree of the user's proficiency in inputting operations are described. The apparatus performs consecutive operations based on set-up data of an operating procedure, and includes a receiving section to receive the set-up data of the operating procedure, an error detecting section to detect an error, a history data memorizing section to memorize the set-up data and history data of the errors as an error history data, an error risk calculating section to calculate a degree of error occurrence risk corresponding to the set-up data, and a warning-information generating section to generate warning-information, corresponding to the degree of error occurrence risk.

13 Claims, 8 Drawing Sheets

FIG. 4

| ID | CHANGE ITEM | ERROR CONTENT | CUMULATIVE JOB COUNT |
|---|---|---|---|
| 1 | PAPER FEEDING METHOD | PAPER SIZE | 5 |
| 2 | PRINTING DENSITY | BAD IMAGE QUALITY | 20 |
| 3 | PAPER FEEDING METHOD | PAPER SIZE | 25 |
| 4 | LAYOUT | BAD IMAGE QUALITY | 26 |
| 5 | PAPER FEEDING METHOD | PAPER SIZE | 50 |
| 6 | PAPER FEEDING METHOD | PAPER SIZE | 50←ERROR OCCURRENCE, DESPITE OF WARNING-INFORMATION |
| 7 | PAPER FEEDING METHOD | OUT OF PAPER | 80 |
| ⋮ | ⋮ | ⋮ | ⋮ |

FIG. 5

STEP b1 — READING OUT DATA FROM ERROR DATA TABLE

STEP b2 — CALCULATING CUMULATIVE ERROR CURVE

STEP b3 — FILTERING PROCESSING

STEP b4 — CALCULATING DEGREE OF ERROR OCCURRENCE RISK, BASED ON MEMBERSHIP FUNCTION

STEP b5 — PRODUCING WARNING-INFORMATION & SENDING IT TO THE USER

STEP b6 — GENERATING INDIVIDUAL USER CONTROL TABLE

FIG. 8 (a)
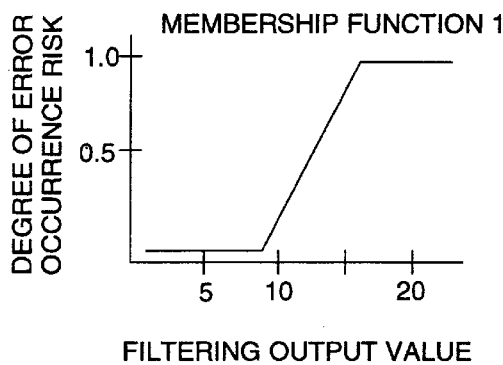
FIG. 8 (b)
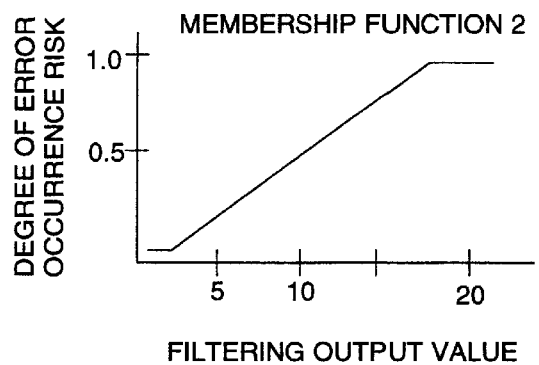
FIG. 9
| SETTING ITEM | DEGREE OF RISK | WARNING METHOD |
|---|---|---|
| PAPER SIZE | 0.1 | DISPLAY ONLY, ONCE A TWICE |
| LAYOUT | 0.1 | DISPLAY ONLY, ONCE A TWICE |
| PAPER FEEDING METHOD | 0.6 | DISPLAY AND VOICE, EVERY TIME |
| ⋮ | ⋮ | ⋮ |
FIG. 10
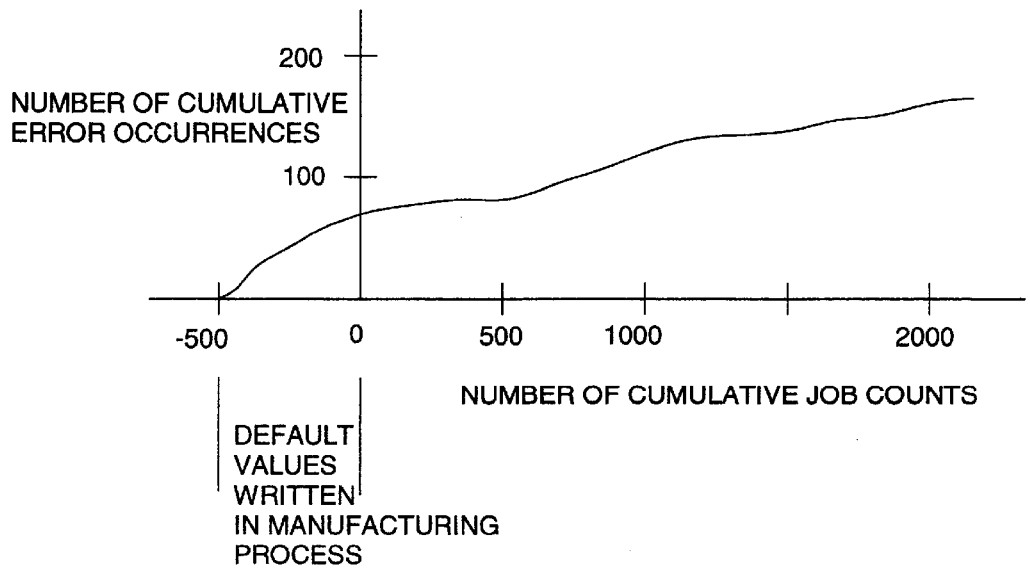

METHOD AND APPARATUS FOR CONTROLLING WARNING-INFORMATION

BACKGROUND OF THE INVENTION

The present invention relates to an apparatus in which consecutive operations are performed on the basis of an operating procedure inputted by a user, and specifically, relates to a control method and an apparatus for outputting warning-information corresponding to the degree of the user's proficiency in inputting operations, based on error history, which is derived from errors detected by the apparatus, due to erroneous inputs by the user.

For instance, a printer, serving as a computer peripheral device, can be cited as an apparatus, which performs consecutive operations based on the operating procedure inputted by the user. It is well known that the use of a conventional printer is often shared by a plurality of users in a computer network. When an operation error in the printer, caused by erroneous inputs by one of the users, is detected, such the printer stops its operation and displays warning-information on the computer display, as well as other computer peripheral devices.

In computer networks, however, the use of the abovementioned printer, serving as a computer peripheral device, is shared by a plurality of users, having among them a wide variety of degrees of proficiency in the inputting operation. Accordingly, in case that a low proficiency user happens to frequently input erroneous commands, operation errors in the printer also occur as frequently and the printer shuts down every time following such input errors. This fact not only negatively influences the operating efficiency of high proficiency users, but also lowers the operating rate of the printer itself. For example, misdirection of the kind of the printing sheet would result in reprinting; misdirection of the requested number of printed sheets would result in stoppage due to running out of sheets; misdirection of color density would result in frequent operation stoppage due to running out of toner; and inadequate knowledge of the image-processing method for color images would result in operation stoppage due to capacity overflow of the memory, or a time-out for the data transfer operation. In every case mentioned above, such misdirection have been the cause of the reduction of the operating rate and waste of resources.

In addition, generally speaking, since the printer is located at a site considerably remote from the user's computer, it has been a laborious task and a waste of time for the user to go to such a remote site and restore the printer.

To improve the abovementioned situation, it may be possible to display warning-information and/or operating instructions on the computer display every time when the user inputs operating procedures to the printer. Although such a method would be most effective for low proficiency users, it would be most cumbersome, however, for high proficiency users, resulting in deterioration of their working efficiency. Even for low proficiency users, the same result will arise as their proficiency improves.

Further, although error frequency will decrease as the proficiency of the user is improved, in some cases, the user tends to repeat the same errors due to wrong misconceptions. This tendency mostly arises at the initial time of a new printer usage in such a case that a user, who has been using a printer made by A company, shifts to use a printer made by B company. This is because the user works under the illusion as if he is still in the same operating criteria as that of the previously used printer.

In the above, the printer is exemplified to describe its problems. Needless to say that the similar problems occur with other computer peripheral apparatus (for instance, facsimiles, scanners, etc.) employed in any computer network.

SUMMARY OF THE INVENTION

To overcome the abovementioned drawbacks in conventional apparatus, for instance, computer peripheral apparatus employed in a computer network, it is the first object of the present invention to provide a method and an apparatus, which makes it possible to change the level of warning-information notifying the user at the time of inputting operations, corresponding to the user's proficiency.

Further, the second object of the present invention is to provide a method and apparatus, in which error occurrence caused by user's erroneous inputs can be reduced by drawing the user's attention mainly to a different operating environment from that of the apparatus previously used.

Further, the third object of the present invention is to provide a method and apparatus, which can display trouble-shooting methods at the time of problems, so that the user can appropriately cope with the trouble.

Accordingly, to overcome the cited shortcomings, the abovementioned objects of the present invention can be attained by methods and apparatus described as follow.

(1) A method for controlling an apparatus, comprising steps of: performing consecutive operations of the apparatus based on set-up data of an operating procedure, inputted by an inputting device; detecting an error, which occurs during the apparatus is performing the consecutive operations; memorizing the set-up data and history data of the errors as an error history data, calculating a degree of error occurrence risk corresponding to the set-up data, based on the set-up data and the error history data; and displaying warning-information, corresponding to the degree of error occurrence risk.

(2) The method of item 1, wherein, at a time of initial set-up of the error history data in the apparatus, the apparatus retrieves the error history data stored in another apparatus of the same type, and memorizes it as an initial error history data of the apparatus.

(3) The method of item 1, wherein, at a time of initial setting of the error history data in the apparatus, the apparatus sets the error history data, stored in the apparatus in advance, as an initial error history data of the apparatus.

(4) The method of item 3, wherein an initial cumulative error value of the error history data, which indicates a cumulative number of error occurrence times, is greater than zero.

(5) The method of item 1, further comprising steps of: determining whether or not the errors exist in the error history data, when the errors occur during the apparatus is performing the consecutive operations; outputting trouble-shooting methods corresponding to the errors by means of an outputting device, in order of large degree of error occurrence risk, in case determining that the errors exist in the error history data and the trouble-shooting methods corresponding to each error are memorized in advance, or, outputting trouble-shooting methods corresponding to the errors by means of an outputting device, in order of retrieving the trouble-shooting methods, in case determining that the errors do not exist in the error history data and the trouble-shooting methods corresponding to each error are memorized in advance; and memorizing contents of the errors and the trouble-shooting methods outputted by the outputting device.

(6) An apparatus, which performs consecutive operations based on set-up data of an operating procedure, comprising: a receiving section to receive the set-up data of the operating procedure; an error detecting section to detect an error, which occurs during the apparatus is performing the consecutive operations; a history data memorizing section to memorize the set-up data, received by the receiving section, and history data of the errors as an error history data; an error risk calculating section to calculate a degree of error occurrence risk corresponding to the set-up data, based on the set-up data and the error history data stored in the history data memorizing section; and a warning-information generating section to generate warning-information, corresponding to the degree of error occurrence risk.

(7) The apparatus of item 6, wherein the history data memorizing section also memorizes a user data, which includes a personal data relevant to an individual user of the apparatus, and, in the history data memorizing section, the set-up data and the error history data are memorized corresponding to the user data, and the error risk calculating section calculates the degree of error occurrence risk every the user data, and the warning-information generating section generates the warning-information every the user data.

(8) The apparatus of item 6, wherein the history data memorizing section stores the error history data in advance, and an initial cumulative error value, which indicates a cumulative number of error occurrence times in the error history data stored in the history data memorizing section in advance, is greater than zero.

(9) The apparatus of item 6, wherein the apparatus is a printer.

(10) The apparatus of item 6, wherein the apparatus is a facsimile.

(11) The apparatus of item 6, wherein the apparatus is a scanner.

(12) The apparatus of item 6, wherein the apparatus is a multi-functional printer.

Further, to overcome the abovementioned problems, other methods and apparatus, embodied in the present invention, will be described as follow:

(13) A control method of an apparatus, characterized in that the control method comprises a step of performing consecutive operations of the apparatus based on set-up data of an operating specification inputted by inputting means, an error detecting step of detecting an error, which occurs during the apparatus is performing the consecutive operations, a history data memorizing step of memorizing the set-up data and a detected error history, a error occurrence risk calculating step of calculating a degree of error occurrence risk with respect to the set-up data, based on the set-up data and the error history data, a warning-information displaying step of displaying warning-information, corresponding to the degree of error occurrence risk.

(14) The control method of item 13, characterized in that, at a time of initial setting of the error history, the control method comprises a step of continuatively setting the error history data downloaded from another apparatus of the same type, or, initially setting an error history complying with the feature of the apparatus, based on the error history data stored in the apparatus in advance.

(15) The control method of item 13 or item 14, characterized in that, at a time of trouble occurrence, the control method comprises a step of determining whether or not the error causing the trouble is included in the error history, a step of displaying trouble-shooting methods for user set-up items in order of large degree of error occurrence risk of retrieved error item, when determining that the errors included in the error history, or, retrieving relevant check items from a manual, stored in advance, to display trouble-shooting methods in order of retrieving the check items, when determining that the errors is not included in the error history, and a step of memorizing contents of the errors and the trouble-shooting performed by the user, in error trouble-shooting history file.

(16) An apparatus, characterized in that, in an apparatus which comprises an inputting means for inputting set-up data with respect to an operating procedure and performs consecutive operations based on the inputted set-up data, the apparatus comprises an error detecting means for detecting an error, which occurs while the apparatus is performing the consecutive operations; a history data memorizing means for memorizing the set-up data and history data of the detected errors; an error risk calculating means for calculating a degree of error occurrence risk, based on the set-up data and the error history data stored in the history data memorizing means; a warning-information outputting means for outputting warning-information, corresponding to the degree of error occurrence risk; and a control means for controlling the warning-information outputting means based on the degree of error occurrence risk, so that the apparatus can change a level of warning-information to be outputted, corresponding to the set-up data.

(17) The apparatus of item 16, characterized in that, the history data memorizing means memorizes the set-up data and the history data for every users who share the use of the apparatus, and the control means controls the warning-information outputting means for every users who share the use of the apparatus.

BRIEF DESCRIPTION OF THE DRAWINGS

Other objects and advantages of the present invention will become apparent upon reading the following detailed description and upon reference to the drawings in which:

FIG. 4 shows an example of the error data table;

FIG. 5 shows a flowchart of calculating the degree of error occurrence risk and the individual user control table;

FIGS. 8(*a*) and 8(*b*) show examples of a membership function being defined as a function between the filtering output value and the degree of error occurrence risk;

FIG. 9 shows an example of an individual user control table;

FIG. 10 shows a cumulative error curve at a time of initial setting of it;

DETAILED DESCRIPTION OF THE PREFERRED EMBODIMENT

Figure 1:
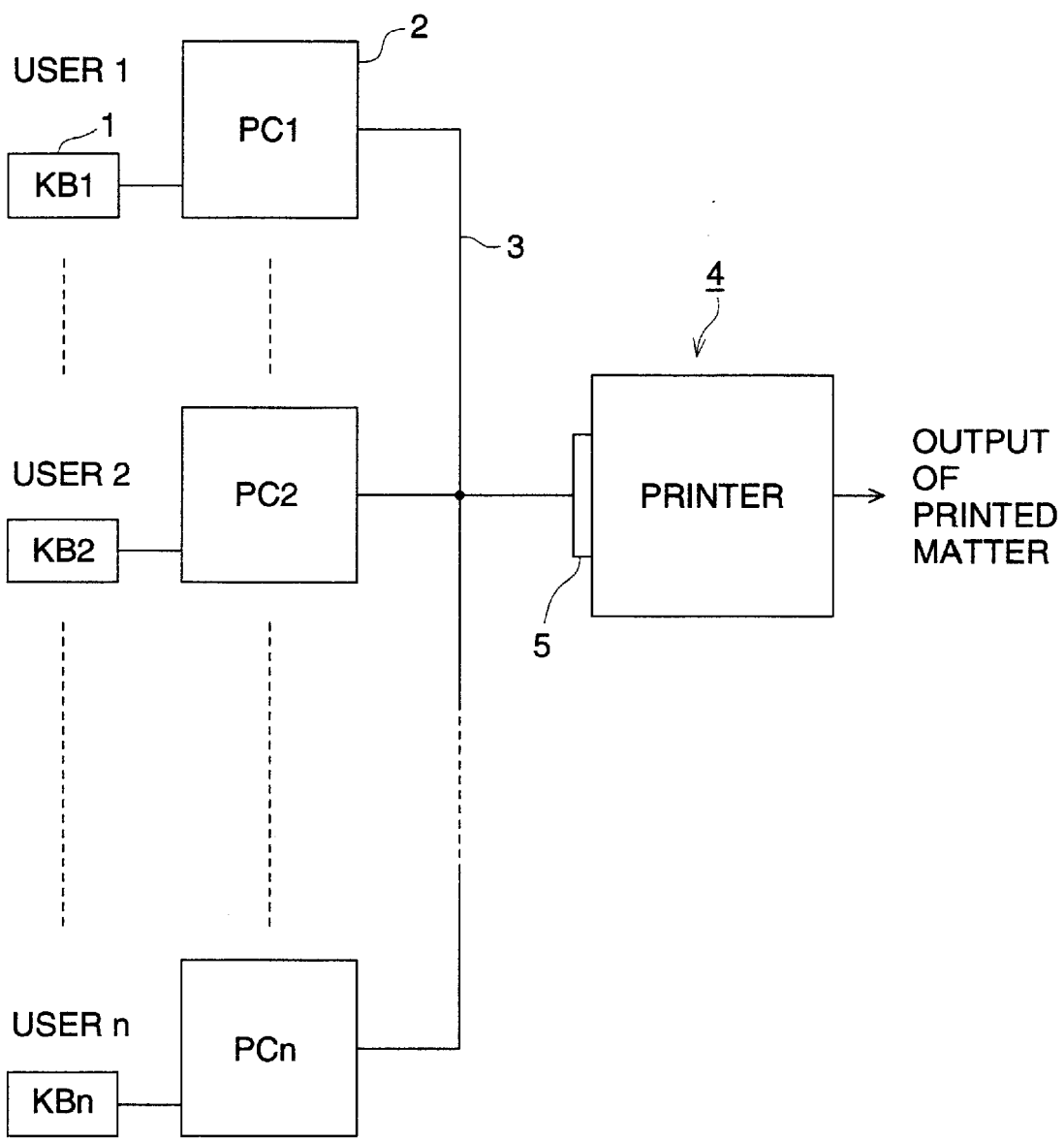
FIG. 1 shows a block-diagram of a computer network in which the use of a printer, having a function of outputting warning-information embodied in the present invention, is shared by a plurality of computers.

Referring to the drawings, an embodiment of the present invention will be detailed in the following.

FIG. 1 shows a block-diagram of a computer network in which the use of a printer, having a feature of outputting warning-information embodied in the present invention, is shared by a plurality of computers. In FIG. 1, numeral 1 indicates keyboards KB1–KBn, serving as an inputting section (inputting means) for each of users, and numeral 2 indicates personal computers PC1–PCn which are coupled in parallel through communication line 3 to interface 5 of printer 4. Communication line 3 is a communication path to form a computer network such as Ethernet, etc., which enables bilateral digital data transmission with a single communication path. Further, printer 4 processes image data and control data, sent from personal computers PC1–PCn, in a time-sharing mode, and delivers printed matter after forming images on selected recording media.

Incidentally, each of personal computers PC1–PCn comprises an outputting section (display means) such as a CRT display, a liquid-crystal display, etc. Therefore, an apparatus, embodied in the present invention, does not necessarily comprise an inputting section and/or an outputting section. Keyboards, touch-panels, voice-recognizing devices, and etc. can be cited as concrete examples of the inputting means, while various kinds of displays, voice-outputting devices, printers and etc. can be cited as concrete examples of the outputting means.

Figure 2:
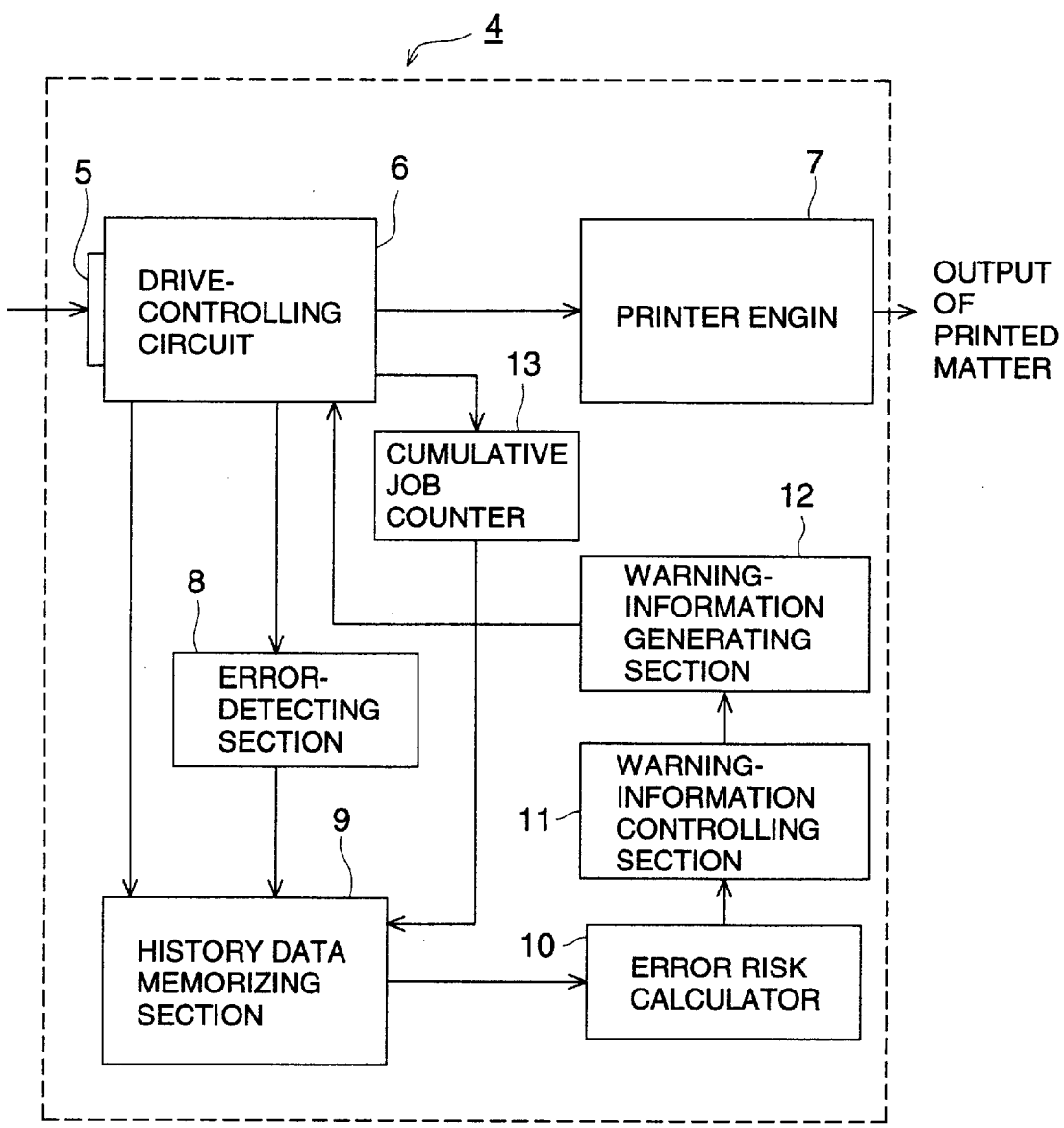
FIG. 2 shows a block-diagram of an internal structure of a printer having a function of outputting warning-information embodied in the present invention.

FIG. 2 shows a block-diagram of the internal structure of printer 4 having a function of outputting warning-information embodied in the present invention. In a conventional printer, image data and control data inputted from interface 5, serving as a set-up data receiving section (receiving means), are processed in drive-controlling circuit 6 to drive each of the sections of printer engine 7, and printed matter is delivered from printer engine 7 after forming images on selected recording media, based on the inputted image data. On the other hand, in the printer embodied in the present invention, blocks of numerals 8–13 are added to the conventional printer mentioned above, in order to attain the aforementioned objects of the present invention by means of data processing and arithmetic processing performed in those blocks.

Incidentally, the "set-up data receiving section (receiving means)" receives set-up data, which is inputted by the inputting means such as the keyboard of the computer, etc., and sent from each of the computers to set an operating procedure of the printer. Further, the "set-up data receiving section (receiving means)" can be also defined as a generic term of electronic circuits, firmware and software for physically and theoretically coupling the apparatus, embodied in the present invention, to other information processing apparatus and for receiving the set-up data sent by other information processing apparatus. Concrete examples of the "set-up data receiving means" includes an interface, etc., and possibly includes an analogue modem, a network card, TA, ATM, PIAFS, ADSL, etc. Circuit boards of a Centronics, RS232C, an Universal Serial Bus (USB), 10 base T. 100 base T, IEEE 1394, PCMCIA and etc. can be cited as other examples of the "set-up data receiving means". In such circuit boards, a serial transfer, a parallel transfer, Ethernet, TCP/IP, Netware and etc. can be cited as the data-transferring mode.

Still further, the "set-up data receiving means" is coupled to a Local Area Network (LAN), a Wide Area Network (WAN), an Internet, etc., and receives set-up data sent from information processing apparatus through a telephone network, a cable network or a wireless network.

Following now, each of blocks 8–13 will be described.

During the time that drive-controlling circuit 6 is performing the consecutive printing operations by driving each section of printer engine 7 based on the image data and/or the control data inputted by interface 5, when an operating error occurs due to a certain defect of the image data and/or the control data caused by the user's inappropriate input of the set-up data, error detecting section 8, serving as a error detecting means, detects contents of the error and sends error data to history data memorizing section 9, serving as a history data memorizing means. History data memorizing section 9 generates and stores an error data table, to be detailed later, corresponding to each of the users in its database, to receive the error data sent from error detecting section 8 and to store them in the error data table of the respective user. Simultaneously, history data memorizing section 9 also memorizes set-up items and their values, which are changed at the time of the inputting operation by the user concerned, based on the image data and/or the control data inputted from interface 5 through drive-controlling circuit 6. Error risk calculator 10, serving as an error occurrence risk calculating means, derives a cumulative error curve, to be detailed later, from the error data table stored in history data memorizing section 9, and further, calculates a degree of error occurrence risk, which indicates the inputting operation proficiency of each user, by performing an arithmetic process, also to be detailed later, and then, sends it to a warning-information controlling section. Warning-information controlling section 11 controls warning-information generating section 12, based on the value of the degree of error occurrence risk received from error risk calculator 10, to select a suitable warning-information which corresponds to the value of the degree of error occurrence risk, namely, the inputting operation proficiency of each user, from a warning-information table, to be detailed later, and transmits the selected warning-information through drive-controlling circuit 6 from interface 5 to the personal computer of the respective user. Cumulative job counter 13 counts the number of the printing jobs of every users, and sends the cumulative number of jobs of every users to history data memorizing section 9.

Incidentally, the "error detecting section (detecting means)" is a means for detecting an error, which occurs during the apparatus is performing consecutive printing operations. A paper-size detecting means for detecting a paper-size, a paper-type detecting means for detecting a paper-type, a paper-thickness detecting means for detecting a paper-thickness, a time-out detecting means and a door-status detecting means can be cited as the "error detecting section (detecting means)". A paper-size detecting means, a paper-type detecting means and a paper-thickness detecting means detect an error, when determining that one of a paper-size, a paper-type and a paper-thickness, detected by them, is different from those set by the user in advance. A time-out detecting means detects an error, when determining that a job is not completed after a predetermined time has elapsed since the user commanded commencement of the job. A door-status detecting means detects an error, when determining that a door of the printer is open when the user commands commencement of a job. Other concrete examples of the "error detecting means" includes CPU, DSP, MPU, IC, Gate Array, Custom IC, LSI, etc., and also includes various kinds of detecting members or devices.

Further, the "history data memorizing section (history data memorizing means)" is a means for memorizing the set-up data received by the set-up data receiving means and the history data detected by the error detecting means. The "history data memorizing section (history data memorizing means)" is a memory, so to speak, for which either an optical, an electronic or a magnetic memorizing method can be employed. It is desirable that an electronic memorizing method, represented by flash-memories and dynamic-RAMs, in which reading and writing actions are rapid, is employed for the history data memorizing means. Concrete examples of the "history data memorizing means" include various kinds of memory, various kinds of ROMs (such as MASK ROM, EPROM, EEPROM, etc.), various kinds of RAMs (such as DRAM, SDRAM, FLASH MEMORY, MINIATURE CARD, COMPACT FLASH, SMART MEDIA, PC CARD, etc.), hard-disks, various kinds of data recording media (such as CD-ROM, CD-R, CD-RW, MT, DAT, DVD, FD, MD, MO, etc.) and the recording/reading apparatus of them, etc.

Still further, the "error risk calculating section (error occurrence risk calculating means)" is a means for calculating a degree of error occurrence risk corresponding to the set-up data, based on the set-up data and the error history data stored in the history data memorizing means. The "error occurrence risk calculating means" is either a MPU (Micro Processing Unit) or a CPU (Central Processing Unit), which can perform the programmed steps of calculating a degree of error occurrence risk, to be detailed later, while either a customized LSI or Gate Array, in which the abovementioned programmed steps are stored in advance, is also applicable for this purpose. Concrete examples of the "error occurrence risk calculating means" include CPU, DSP, CUSTOM IC, LSI, etc.

Still further, the "warning-information generating section (warning-information generating means)" is a means for generating warning-information corresponding to the degree of error occurrence risk. As for a configuration of the "warning-information generating means", it is possible that it generates warning-information when the degree of error occurrence risk exceeds a predetermined value, or also possible that it changes the kind of warning-information and/or a outputting mode of warning-information, corresponding to the degree of error occurrence risk.

It is possible that the "warning-information generating means" comprises the warning-information controlling section and the warning-information generating section, as aforementioned. In addition, it is also possible that the "warning-information generating means" comprises a warning-information transmitting means for transmitting warning-information to each of the personal computers. Further yet, it is also possible that the "warning-information generating means" comprises a memory means (for instance, such as a warning-information table), which stores various kinds of warning-information and outputting methods of warning-information corresponding to the degree of error occurrence risk for every set-up item of the operating procedure. The "warning-information generating means" is either a MPU (Micro Processing Unit) or a CPU (Central Processing Unit), which can perform the programmed steps of generating warning-information, to be detailed later, while either a customized LSI or Gate Array, in which the abovementioned programmed steps are stored in advance, is also applicable for this purpose. Concrete examples of the "warning-information generating means" include various kinds of memory, various kinds of ROMs, various kinds of RAMs, hard-disks, various kinds of data recording media and recording/reading apparatus of them, CPU, DSP, CUSTOM IC, LSI, structural combinations of the above devices, etc.

Furthermore, it is also possible that a combination of the "history data memorizing means" and the "error occurrence risk calculating means" is cited as a "user's proficiency detecting means" for detecting the degree of each user's proficiency in the operation of the apparatus concerned. In addition, it is also possible that the "warning-information generating means" is cited as a means for generating warning-information corresponding to the degree of user's proficiency detected by the "user's proficiency detecting means".

Still further, the "history data memorizing means" and the "warning-information generating means" can be equipped as either two separate structures or an integrated single structure serving both functions. In addition, the "error occurrence risk calculating means" and the "warning-information generating means" can as well be equipped as either two separate structures or an integrated single structure serving both functions.

In the apparatus embodied in the present invention, it is desirable that user data is employed for identifying each of the users. Specifically, it is desirable that the "history data memorizing means" memorizes the user data, which represent the user currently using the apparatus, and stores the set-up data and the error history data corresponding to the respective user data. Accordingly, it is desirable that the "error occurrence risk calculating means" calculates the degree of error occurrence risk at every set-up of data, and the "warning-information generating means" generates warning-information based on the degree of error occurrence risk of every user data. In the configuration mentioned above, it becomes possible that the apparatus performs either outputting of warning-information, stopping of warning-information or changing contents of the warning-information, in response to the degree of each user's proficiency.

For instance, personal ID data employed for either the personal computer or the downloaded software can be utilized as the user data. Specifically, a method for automatically retrieving the personal ID data (a combination of a plurality of numerals and characters) of either the personal computer or the downloaded software by means of the apparatus (such as the printer, etc.) coupled to the personal computer, or a method for receiving the personal ID data inputted from the inputting means of the personal computer by the user, would be available for this purpose. In such methods, it is desirable that a memory means, such as the "history data memorizing means", memorizes the personal ID data as the user data in advance, and then, the user inputs the personal ID data of either the personal computer or the software, when using the apparatus, while the apparatus performs such actions as memorizing the set-up data and the error history data, calculating the degree of error occurrence risk and generating warning-information, with respect to every user data.

Further, to recognize the user more strictly, a method in which each of users sets personal ID data by him/herself would be available. For instance, a method in which the personal ID data (a combination of a plurality of numerals and characters) of each user is inputted from the inputting means of the personal computer and the apparatus receives the personal ID data would be available for this purpose. In such the method, it is desirable that a memory means, such as the "history data memorizing means", memorizes the personal ID data as the user data in advance, and then, the user inputs his/her own personal ID data, when using the apparatus, while the apparatus performs such actions as memorizing the set-up data and the error history data, calculating the degree of error occurrence risk and generating warning-information, with respect to every user data.

Alternatively, a method for identifying each user by means of the detecting device, which detects either a fingerprints or a voiceprint of the user, and the identified results as the user data, would also be available for this purpose. In such a method, when the user uses the apparatus, it is desirable that a memory means, such as the "history data memorizing means", memorizes the user data in advance, and then, either a fingerprints or a voiceprint of the user detected by the detecting device to input identified results as the user data, while the apparatus performs such actions as memorizing the set-up data and the error history data, calculating the degree of error occurrence risk and generating warning-information, with respect to every user data.

Next, referring to FIG. 3–FIG. 12, an exemplified embodiment of the present invention will be detailed in the following.

Figure 3:
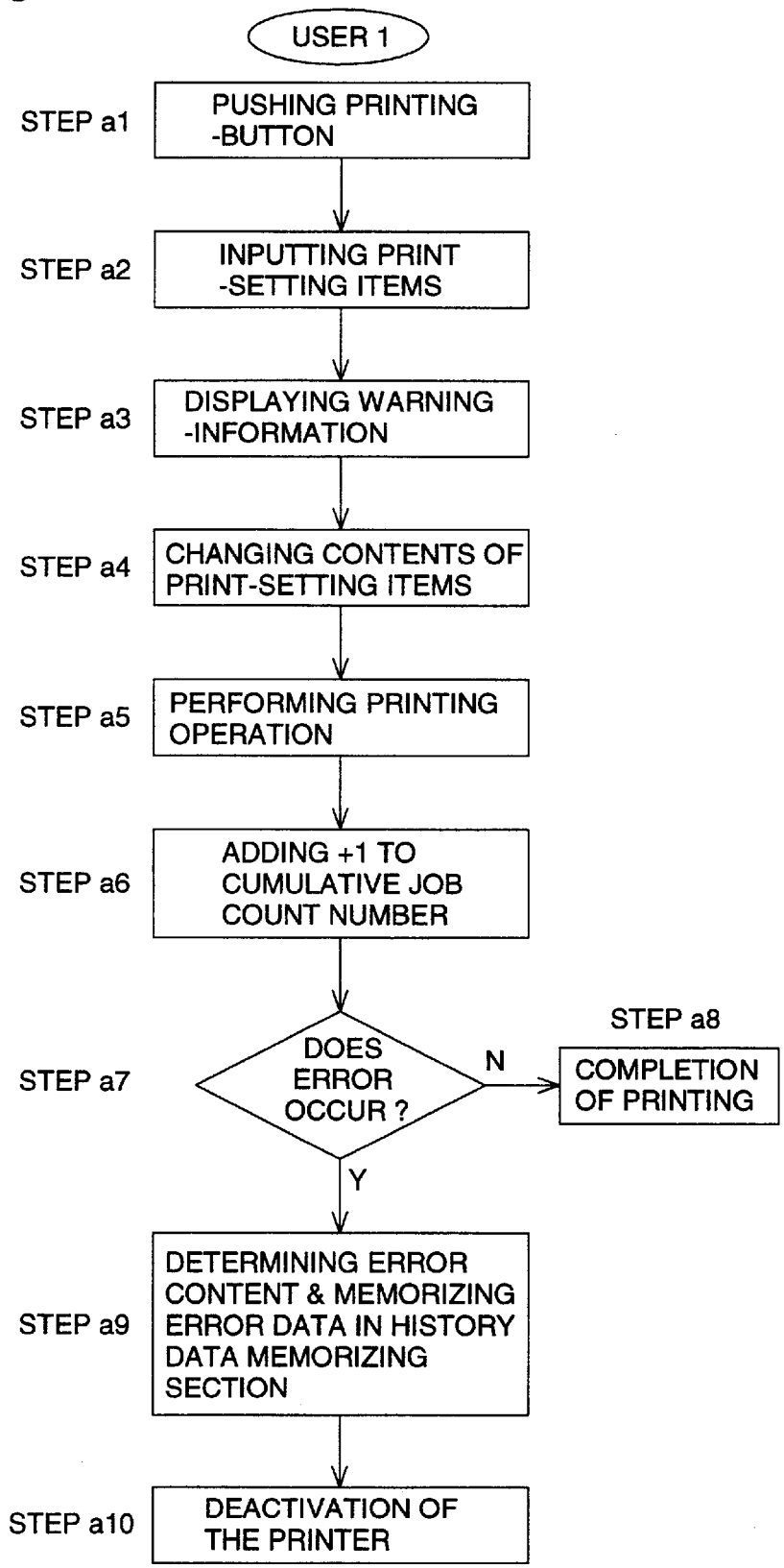
FIG. 3 shows a flowchart of an operating procedure of the printer, having a feature of outputting the warning-information embodied in the present invention, including fundamental steps from the step of inputting print-setup options by the user to the step of finalizing or stopping the print operation.

FIG. 3 shows a flowchart of an operating procedure of the printer, having a feature of outputting the warning-information embodied in the present invention, including fundamental steps from the step of inputting print-set-up criteria by the user to the step of finalizing or stopping the printing operation.

At first, user 1, corresponding to the user of personal computer PC1 shown in FIG. 1, pushes the printing-button displayed on the display of PC1 (step a1). Then, PC1 displays print-setting parameters from which user 1 inputs desirable data for every print-setting option (step a2). When user 1 pushes the completion-button of the print-setup options, PC1 displays the warning-information, which corresponds to user 1, based on the respective individual user control table, which is prepared and stored in PC1 in advance (step a3) and which will be detailed later. User 1 checks the print-setup options by himself, based on the warning-information displayed by PC1, and, if necessary, changes the contents of the print-setup options (step a4). When user 1 pushes the completion-button of the print-setup options again, PC1 sends the image data and the control data to the printer, and then, the printer performs the printing operation by following the print-setup options set by user 1 (step a5). When the printing operation starts, cumulative job counter 13 adds +1 to the cumulative job count number of user 1 (step a6). While drive-controlling circuit 6 performs the printing operation, error-detecting section 8 checks status signals in various parts of drive-controlling circuit 6 to detect presence or absence of an error occurrence (step a7). When no error occurs, the printing operation continues until all of prints are completed (step a8). When a certain error occurs, error-detecting section 8 decodes the status signals outputted from drive-controlling circuit 6 to determine the content of the error, and sends the error data to history data memorizing section 9. Then, the error data is memorized in the error data table stored in the history data memorizing section (step a9). Drive-controlling circuit 6 stops the printing operation at the time of the error occurrence, and the printer waits the restoring operation by user 1 (step a10).

Next, a process of calculating the degree of error occurrence risk and the individual user control table will be detailed in the following.

FIG. 5 shows a flowchart for calculating the degree of error occurrence risk, and further, the individual user control table, based on the error data table prepared and stored by repeating the steps of the flowchart shown in FIG. 3. This calculating process is performed at a fixed time (for example, once a week, midnight, etc.), after predetermined periods corresponding to the operating frequency of the printer.

FIG. 4 shows an example of the error data table. In FIG. 4, the ID column indicates a serial number of each error occurrence, which also indicates the cumulative times of error occurrences. The "change item" column indicates the set-up item, which the user changes just before the error occurrence. The "error content" column indicates the name of the categorized error item, and the "cumulative job count" column indicates the number of cumulative printing jobs at the time when the error occurs. Incidentally, the error data table, shown in FIG. 4, is prepared for every user (user 1–user n) who shares the use of that printer.

Figure 6:
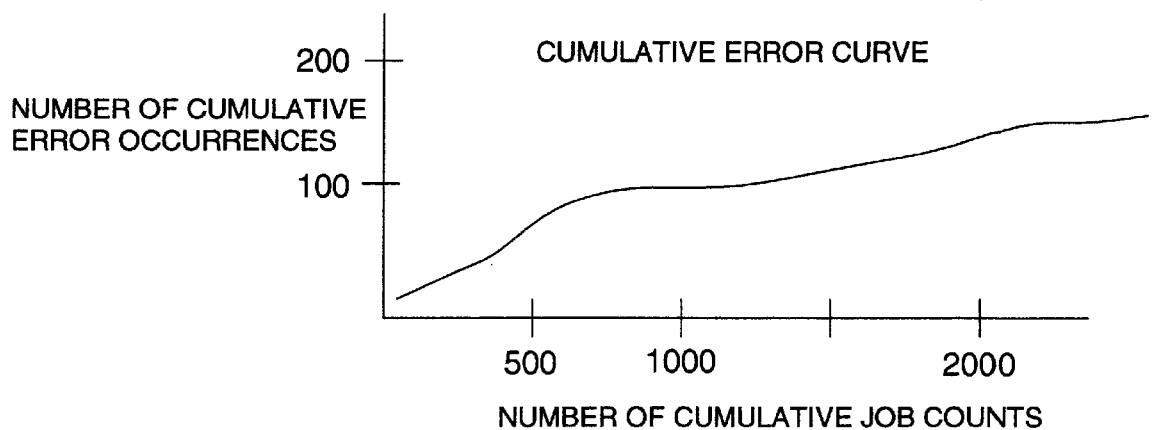
FIG. 6 shows a cumulative error curve, which is calculated in the printer embodied in the present invention.
Figure 7:
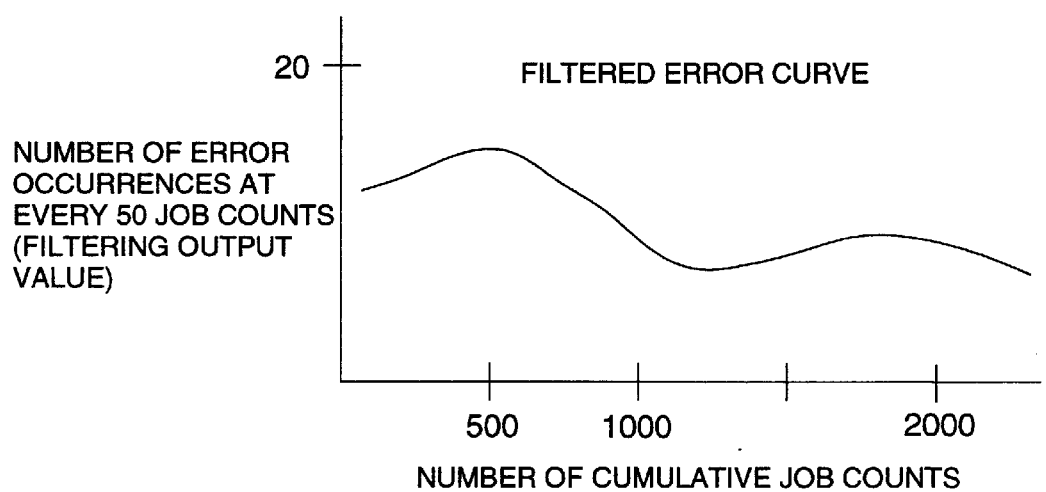
FIG. 7 shows a filtered error curve, which is calculated by applying a filtering processing to the cumulative error curve.

In FIG. 5, error risk calculator 10 reads out the cumulative times of error occurrences and the number of cumulative jobs from the error data table (step b1), to calculate the cumulative error curve shown in FIG. 6, in which the vertical axis indicates the cumulative times of error occurrences, while the horizontal axis indicates the number of cumulative job count. The cumulative error curve is calculated for every user and every print-setup options (step b2). Then, a filtering process is applied to the cumulative error curve to calculate the filtered error curve, shown in FIG. 7 (step b3). In the filtering process, defined in the present invention, the filtered error is equivalent to the frequency of error occurrences within the most recent 50 jobs (filtering output), and in FIG. 7, the vertical axis indicates the number of times of error occurrences for every 50 jobs (filtering output value), while the horizontal axis indicates the number of cumulative job count. It is also applicable to calculate the filtering output value by synthesizing the filtered error within the most recent 100 jobs and the filtered error within the most recent 50 jobs with a suitable weighting, if necessary. In addition, it is also applicable to give a weight to the error count corresponding to the type of error.

The filtering output value, derived in the manner as mentioned above, is compared to the membership function, which is prepared and memorized in advance, to calculate the degree of error occurrence risk at the present job count number (step b4).

Incidentally, as shown in FIGS. 8(a) and 8(b), the membership function is defined as a function exhibiting the relationship between the filtering output value and the degree of error occurrence risk with a distinctive straight line and/or curve. A plurality of the membership functions, which are changeable, are prepared and memorized in advance, and are stated in advance to apply them for every user and every print-setting item.

For instance, membership function 1, shown in FIG. 8(a), can be applied for the print-setting item (for example, setting of both/single side printing, etc.) for which the users suffer from relatively little inconvenience caused by the error, since the rising point of the curve of the error occurrence risk is located at a relatively large value of the filtering output. While, membership function 2, shown in FIG. 8(b), can be applied for the print-setting item (for example, setting of paper size, paper quality, etc.) for which the users suffer from relatively a big damage caused by the error, since the rising point of the line of the error occurrence risk is located at a relatively small value of the filtering output and the line is gradually rising.

Next, the degree of error occurrence risk, calculated in step 4, is sent to warning-information controlling section 11. Then, warning-information controlling section 11 controls warning-information generating section 12, based on the degree of error occurrence risk. In warning-information generating section 12, a warning-information table is provided in advance for storing error messages and warning methods for every setting option, corresponding to the degree of error occurrence risk, and then, suitable error messages and warning methods are read out, based on the control signals sent from warning-information controlling section 11 to produce a warning-information for the user concerned. The produced warning-information is sent to the user, for example, personal computer PC1 of user 1, from interface 5 through drive-controlling circuit 6 (step b5).

When PC1 receives the warning-information, PC1 generates the individual user control table, shown in FIG. 9, in which the degree of error occurrence risk, warning methods and error messages are written for every print-setup option, and PC1 stores it (step b6). Incidentally, when PC1 receives a new warning-information, PC1 rewrites the contents of the print-setup options concerned.

In the manner mention above, the individual user control table, in which the latest warning-information, corresponding to the proficiency of each user, are written, is prepared in each of personal computers PC1–PCn for users 1–n. The displaying action of the warning-information in step a3, shown in FIG. 3, is performed based on this individual user control table.

Described next, will be a method for setting initial data in the error information table.

When a new user starts using the printer concerned, no warning-information will be displayed at all, since the value of the cumulative error count of any new user is set at zero immediately after commencement of the use, despite the fact that warning-information are specifically necessary for a new user. To mitigate the above drawback, in the manufacturing process of the printer embodied in the present invention, the initial error information table, in which the default values are already written, is stored in advance in history data memorizing section 9 of the printer, and, when a new user starts to use the printer concerned, the initial error information table is initially set as the error information table of such a new user. Then, as shown in FIG. 10, initial setting of the cumulative error curve of the new user is also achieved based on the error information table set initially. In FIG. 10, the cumulative error curve, set at a region between −500 and 0 in the horizontal axis of cumulative job count, is derived from the default values written during the manufacturing process, while the cumulative error curve for the number of cumulative job count larger than 0 is derived from the results of practical use by the user concerned.

Further, according to the present invention, in such a large scale computer network that a plurality of printers are coupled to a plurality of personal computer groups, when an user of an arbitrary personal computer (a first computer) which belongs to an arbitrary personal computer group (a first computer group) moves to another arbitrary personal computer (a second computer) which belongs to another arbitrary personal computer group (a second computer group), it is possible that the second computer prompts the user the type of printer previously used with the first computer and changes the membership functions with respect to every print-setup options specifically set for the user concerned, corresponding to the type of the printer inputted by the user. Otherwise, it is also possible to change the default values written in the initial error information table prepared during the manufacturing process of the printer.

Accordingly, it becomes possible to draw each user's attentions mainly to the print-setup options liable to be erroneously inputted by the user, associating with the change of the type of the printer.

On the other hand, when the type of the previous printer, inputted by the user, is the same type as the printer used with the second computer, it is possible that the printer, used with the second computer, searches out the previous printer, used with the first computer, to download the error information table into the printer used with the second computer.

Accordingly, it becomes possible for the user to receive the warning-information in a continuous operating environment, the same as that of the first computer.

Figure 11:
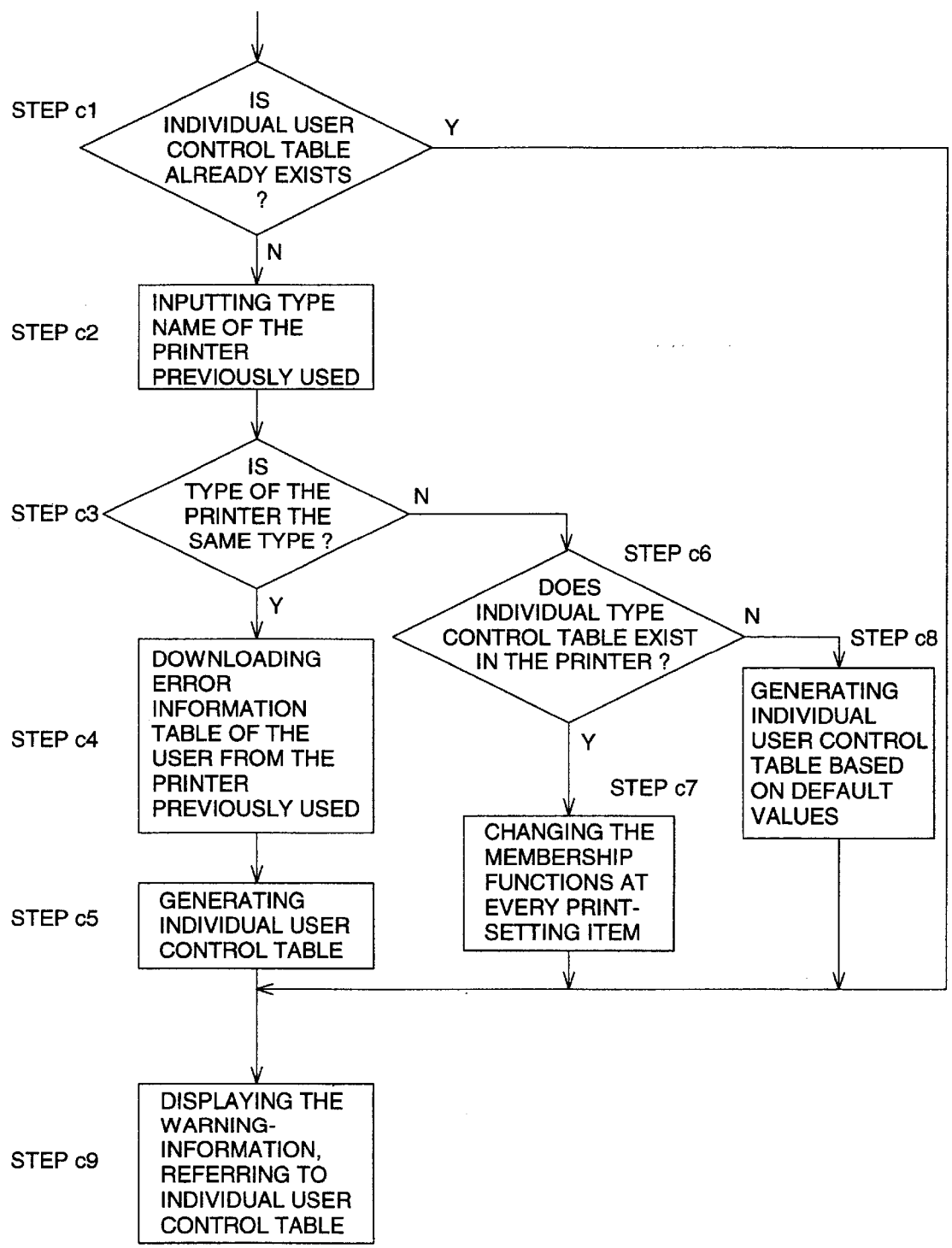
FIG. 11 shows a flowchart of a setting procedure of the individual user control table at the time of the user movement.

FIG. 11 shows a flowchart of a setting-up procedure of the individual user control table at the time of the user relocation mentioned above. Referring to FIG. 11, the flowchart will be detailed in the following.

At the time of the initial use of the printer, the second computer determines whether or not an individual user control table for the user concerned already exists (step c1). When determining that the individual user control table exists in step c1, the second computer jumps to step c9 at the end of the flowchart. When not in step c1, the second computer prompts the user to identify the type of the printer previously used with the first computer, and the user specifically inputs the type of printer concerned (step c2). The second computer determines whether or not the type of the printer inputted by the user is the same as that of the printer used with the second computer (step c3). When determining that the printer is the same in step c3, the printer, used with the second computer, downloads the error information table of the user concerned from the printer used with the first computer (step c4). The downloaded error information table is stored in history data memorizing section 9 of the printer used with the second computer, and then, the individual user control table is generated in the second computer based on the downloaded error information table by performing the procedure shown in the flowchart of FIG. 5 (step c5). Referring to the generated individual user control table, the second computer displays the warning-information on the screen (step c9).

On the other hand, when not in step c3, the second computer determines whether or not an individual type control table, with respect to the printer used with the first computer, exists in the printer (step c6). The individual type control table, defined in the present invention, includes control data necessary for selecting the membership functions and for changing the contents of the error information table, in order to cope with errors and troubles, which are liable to occur when the type of printer is changed. For this purpose, a plurality of the individual type control tables, with respect to other potential types of printers, are prepared in advance during the manufacturing process of the printer concerned. When determining that the individual type control table, with respect to the printer used with the first computer, exists in the printer in step 6, the second computer changes the membership functions for every print-setup options, and, if necessary, also changes the default values in the error information table prepared during the manufacturing process of the printer, to generate the individual user control table (step c7). This is done because, depending on the type of the printer, there is a possibility that errors will frequently occur in the same operating manner as that for the previous printer, and it is necessary to change the membership functions to new ones, which are particularly suited for the type of the printer concerned. When not in step c6, the individual user control table is generated in the second computer, based on default values in the error information table prepared during the manufacturing process of the printer, according to the procedure of the flowchart shown in FIG. 5 (step c8). Referring to the generated individual user control table, the second computer displays the warning-information on the screen (step c9).

Further, according to the present invention, when the printer does not commence the printing operation, despite the fact that the user has sent a print command to the printer, or when a certain problem occurs in the printer, such as when the printer abruptly stops in the mid-course of printing, etc., it is also possible to make servicing options for the printer easies by displaying suitable trouble-shooting methods on the display screen and by setting up a trouble-shooting history file.

Figure 12:
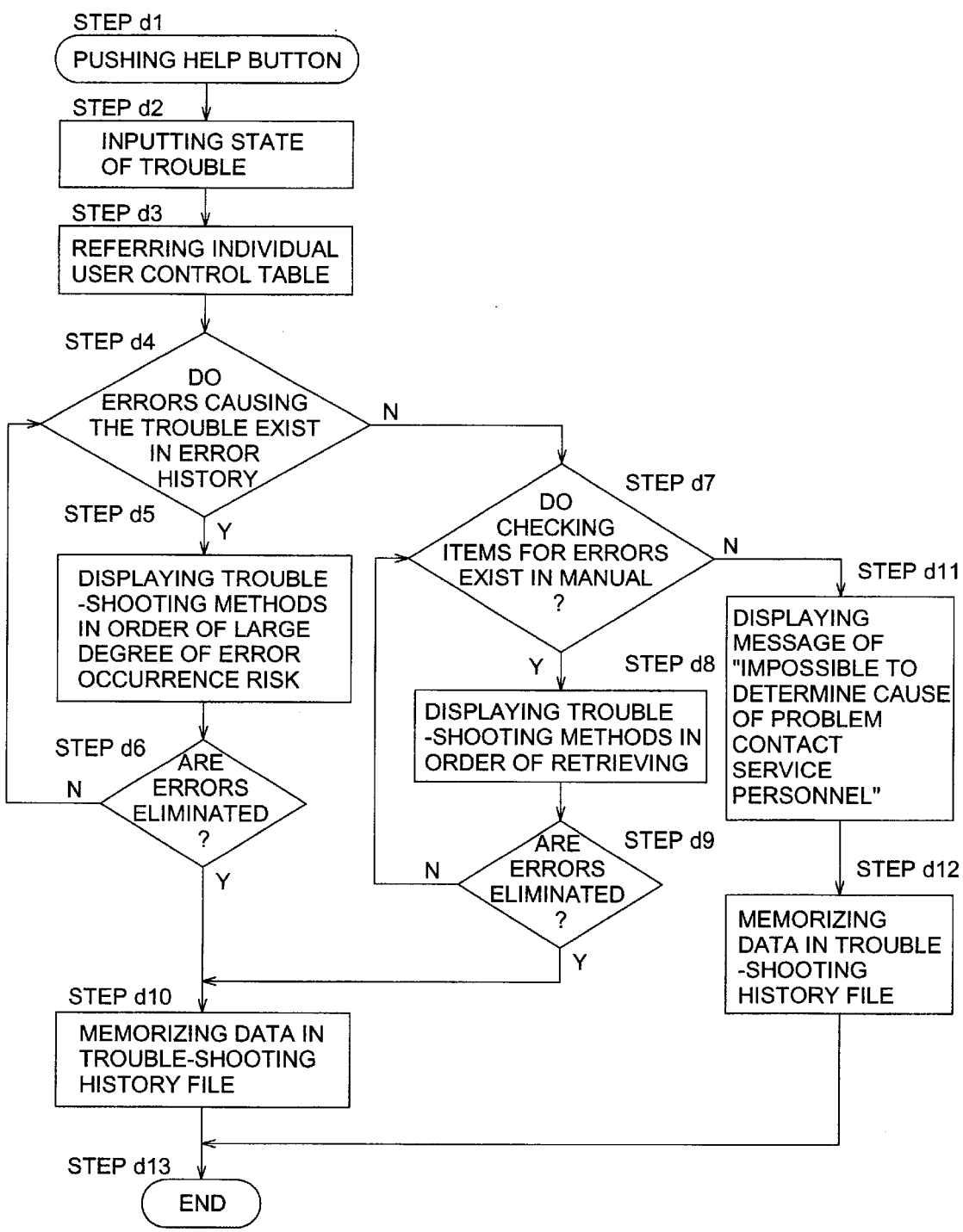
FIG. 12 shows a flowchart of the trouble-shooting procedure in case of trouble of the printer.

FIG. 12 shows a flowchart of the trouble-shooting procedure for the problem mentioned above.

The flowchart of the trouble-shooting procedure comprises the steps of: step d1, the user pushes the help button on the computer display screen when a certain problem happens; step d2, the state of the problem is inputted by automatically inputting the contents of detected errors or by selecting specific error options from the optional table by the user; step d3, referring the individual user control table; step d4, determining whether or not errors causing the problem exist in the error history; step d5, displaying trouble-shooting methods on the computer screen in order of large degree of error occurrence risks when determining that errors causing the problem exists in the error history in step d4, and the user performs the countermeasures according to the displayed trouble-shooting methods; step d6, determining whether or not the errors are eliminated as a result of performing the countermeasures, and returning to step d4 when the errors are not eliminated; step d10, memorizing the error contents and the performed countermeasures in the trouble-shooting history file; step d7, retrieving a manual, which is downloaded in the printer during the manufacturing process of the printer, when not in step d4, and determining whether or not checking items for errors concerned exist in the manual; step d8, displaying suitable trouble-shooting methods for the user in order of retrieving when determining that checking items for errors concerned exist in the manual in step d7, and the user performs countermeasures according to trouble-shooting methods displayed on the screen; step d9, determining whether or not the errors are eliminated as a result of performing the countermeasures, and returning to step d7 when the errors are not eliminated or entering step d10 when the errors are eliminated; step d11, displaying a message of "IMPOSSIBLE TO DETERMINE CAUSE OF PROBLEM, CONTACT SERVICE PERSONNEL" when not in step d7; step d12, memorizing the error contents and the purport of "IMPOSSIBLE TO DETERMINE CAUSE OF PROBLEM" in the trouble-shooting history file; and step d13, finalizing the flowchart of the trouble-shooting procedure, when either step d10 or step d12 is completed.

Since the trouble-shooting history file mentioned above is stored in history data memorizing section 9 of the printer of every user, and can be sent to the service personnel when the user contacts him, it is possible to easily and reliably notify the service personnel of what kind of countermeasures the user performed.

Although, in the aforementioned embodiment of the present invention, the printer, serving as a computer peripheral device, is exemplified to detail its configuration, functions, procedures, etc., needless to say that the technical spirit of the present invention can be applied for other computer peripheral devices, as it is, in the same manner as the aforementioned embodiment of the present invention.

Further, the present invention can be also applied for general apparatus independently used by users, such as house-hold equipment, measuring equipment, etc., under the condition that the apparatus is provided with the configuration which fulfills preconditions of the present invention.

Incidentally, concrete examples of the apparatus embodied in the present invention, include, for instance, the aforementioned printer being a desirable example, facsimiles, scanners, multi-functional printers in which a facsimile and a copier are integrally incorporated, etc.

As detailed in the above, according to the methods and apparatus, embodied in the present invention, having a function of controlling warning-information, since the contents of errors in the apparatus caused by erroneous input by the user can be detected and the degree of error occurrence risk, which indicates the proficiency of the user, can be calculated based on the detected error history data, it becomes possible to change the degree of warning-information, displayed on the warning means, corresponding to the proficiency of the user in his/her inputting operation. Thus, the present invention makes it possible to provide an apparatus, in which warning-information is displayed on the warning means, corresponding to the proficiency of the individual user.

Further, in the network system introducing an apparatus embodied in the present invention, it becomes possible to reduce the number of errors occurring frequently caused by users of low proficiency, without bothering users of high proficiency, by displaying warning-information corresponding to the proficiency of the individual user. Thus, the operating rate of apparatus in the network system will be improved and the stress of the individual user will be also relieved, resulting in improvement of the efficiency in the network system as a whole.

Disclosed embodiment can be varied by a skilled person without departing from the spirit and scope of the invention.

What is claimed is:

1. A method for controlling an apparatus, comprising steps of:

performing consecutive operations of said apparatus based on set-up data of an operating procedure, inputted by an inputting device;

detecting an error, which occurs during said apparatus is performing said consecutive operations;

memorizing said set-up data and history data of said errors as an error history data;

inputting a type of said apparatus;

calculating a degree of error occurrence risk corresponding to said set-up data, based on said set-up data, said type of said apparatus, and said error history data; and displaying warning-information, corresponding to said degree of error occurrence risk.

2. The method of claim 1, wherein, at a time of initial setting of said error history data in said apparatus, said apparatus retrieves said error history data stored in another apparatus of the same type, and memorizes it as an initial error history data of said apparatus.

3. The method of claim 1, wherein, at a time of initial setting of said error history data in said apparatus, said apparatus sets said error history data, stored in said apparatus in advance, as an initial error history data of said apparatus.

4. The method of claim 3, wherein an initial cumulative error value of said error history data, which indicates a cumulative number of error occurrence times, is greater than zero.

5. The method of claim 1, further comprising steps of:

determining whether or not said errors exist in said error history data, when said errors occur during said apparatus is performing said consecutive operations;

outputting trouble-shooting methods corresponding to said errors by means of an outputting device, in order of large degree of error occurrence risk, in case determining that said errors exist in said error history data and said trouble-shooting methods corresponding to each error are memorized in advance, or, outputting trouble-shooting methods corresponding to said errors by means of an outputting device, in order of retrieving said trouble-shooting methods, in case determining that said errors do not exist in said error history data and said trouble-shooting methods corresponding to each error are memorized in advance; and memorizing contents of said errors and said trouble-shooting methods outputted by said outputting device.

6. An apparatus, which performs consecutive operations based on set-up data of an operating procedure, comprising:

a receiving section to receive said set-up data of said operating procedure;

an error detecting section to detect an error, which occurs during said apparatus is performing said consecutive operations;

a history data memorizing section to memorize said setup data, received by said receiving section, and history data of said errors as an error history data;

an inputting section to input a type of said apparatus;

an error risk calculating section to calculate a degree of error occurrence risk corresponding to said set-up data, based on said set-up data, said type of said apparatus, and said error history data stored in said history data memorizing section; and a warning-information generating section to generate warning-information, corresponding to said degree of error occurrence risk.

7. The apparatus of claim 6, wherein said history data memorizing section also memorizes a user data, which includes a personal data relevant to an individual user of said apparatus, and, in said history data memorizing section, said set-up data and said error history data are memorized corresponding to said user data, and said error risk calculating section calculates said degree of error occurrence risk every said user data, and said warning-information generating section generates said warning-information every said user data.

8. The apparatus of claim 6, wherein said history data memorizing section stores said error history data in advance, and an initial cumulative error value, which indicates a cumulative number of error occurrence times in said error history data stored in said history data memorizing section in advance, is greater than zero.

9. The apparatus of claim 6, wherein said apparatus is a printer.

10. The apparatus of claim 6, wherein said apparatus is a facsimile.

11. The apparatus of claim 6, wherein said apparatus is a scanner.

12. The apparatus of claim 6, wherein said apparatus is a multi-functional printer.

13. A network system, comprising:

a plurality of computers, each of which comprises,
  an inputting section, and
  an outputting section; and an apparatus, which performs consecutive operations based on set-up data of an operating procedure, and comprises
  a receiving section to receive said set-up data of said operating procedure, inputted by said inputting section,
  an error detecting section to detect an error, which occurs during said apparatus is performing said consecutive operations,
  a history data memorizing section to memorize said setup data, received by said receiving section, and history data of said errors as an error history data,
  a type of inputting section to input a type of said apparatus,
  an error risk calculating section to calculate a degree of error occurrence risk corresponding to said set-up data, based on said set-up data, said type of said apparatus, and said error history data stored in said history data memorizing section, and
  a warning-information generating section to generate warning-information, corresponding to said degree of error occurrence risk, wherein said outputting section outputs said warning-information generated by said warning-information generating section.

* * * * *